(12) United States Patent
Zhang et al.

(10) Patent No.: US 10,985,656 B2
(45) Date of Patent: Apr. 20, 2021

(54) SYSTEMS AND METHODS FOR PROVIDING INTELLIGENT CONSTANT ON-TIME CONTROL

(71) Applicant: Kinetic Technologies, San Jose, CA (US)

(72) Inventors: Xin Zhang, San Jose, CA (US); Jan Nilsson, Sunnyvale, CA (US); William Robert Pelletier, Campbell, CA (US)

(73) Assignee: Kinetic Technologies, San Jose, CA (US)

( * ) Notice: Subject to any disclaimer, the term of this patent is extended or adjusted under 35 U.S.C. 154(b) by 0 days.

(21) Appl. No.: 16/907,648

(22) Filed: Jun. 22, 2020

(65) Prior Publication Data

US 2020/0321864 A1    Oct. 8, 2020

Related U.S. Application Data

(62) Division of application No. 15/965,257, filed on Apr. 27, 2018, now Pat. No. 10,727,745.

(60) Provisional application No. 62/536,598, filed on Jul. 25, 2017.

(51) Int. Cl.
  *H02M 3/157*   (2006.01)
  *H02M 3/158*   (2006.01)
(52) U.S. Cl.
  CPC ........... *H02M 3/157* (2013.01); *H02M 3/158* (2013.01)
(58) Field of Classification Search
  CPC ....................................... H02M 3/156–3/1588
  See application file for complete search history.

(56) References Cited

U.S. PATENT DOCUMENTS

| | | | |
|---|---|---|---|
| 6,970,046 | B2 | 11/2005 | Da Dalt et al. |
| 7,045,993 | B1 | 5/2006 | Tomiyoshi |
| 8,169,207 | B2 | 5/2012 | Omi |
| 8,493,048 | B2 | 7/2013 | Zhang |

(Continued)

FOREIGN PATENT DOCUMENTS

| | | |
|---|---|---|
| CN | 1398455 A | 2/2003 |
| CN | 101364768 A | 2/2009 |

(Continued)

OTHER PUBLICATIONS

Office Action and Search Report dated Jun. 5, 2019, issued in related Taiwan Application No. 107125717 (14 pages), with English machine translation.

(Continued)

*Primary Examiner* — Rafael O De Leon Domenech
(74) *Attorney, Agent, or Firm* — Sheppard Mullin Richter & Hampton LLP

(57) ABSTRACT

A system that provides intelligent constant on-time control may include a first switch coupled to a power input; a second switch coupled to the first switch; a switching node between the first switch and the second switch, the switching node configured to be connected to an inductor and a power output; feedback paths coupled to (1) a synthesized node and (2) the power output, the feedback paths enabling feedback of signals from (1) the synthesized node, and (2) the power output; and a controller coupled to the feedback paths. The controller may be configured to control a voltage at the power output based on a combination of the signals carried by the feedback paths.

15 Claims, 17 Drawing Sheets

(56) References Cited

U.S. PATENT DOCUMENTS

| | | |
|---|---|---|
| 9,214,866 B2 | 12/2015 | Nora |
| 9,525,351 B2 | 12/2016 | Li et al. |
| 9,608,622 B2 | 3/2017 | Mori |
| 9,954,455 B2 | 4/2018 | Lin et al. |
| 10,020,734 B2 | 7/2018 | Zhong |
| 2008/0030181 A1 | 2/2008 | Liu et al. |
| 2008/0061750 A1 | 3/2008 | Stoichita |
| 2014/0132232 A1 | 5/2014 | MacLean et al. |
| 2014/0239925 A1* | 8/2014 | Tanabe ............... H02M 3/158 323/271 |
| 2014/0253082 A1 | 9/2014 | Swanson et al. |
| 2014/0361755 A1* | 12/2014 | Tateishi ............ H02M 3/1588 323/271 |
| 2014/0375288 A1 | 12/2014 | Nora |
| 2015/0263617 A1 | 9/2015 | Xue et al. |
| 2015/0280557 A1 | 10/2015 | Xue et al. |
| 2017/0077812 A1 | 3/2017 | Guo |
| 2018/0131379 A1 | 5/2018 | Li |

FOREIGN PATENT DOCUMENTS

| | | |
|---|---|---|
| CN | 104158392 A | 11/2014 |
| CN | 104283423 A | 1/2015 |
| CN | 104617771 A | 5/2015 |
| CN | 105375760 A | 3/2016 |
| CN | 105790581 A | 7/2016 |
| CN | 105978303 A | 9/2016 |
| CN | 106533135 A | 3/2017 |
| CN | 106533154 A | 3/2017 |
| JP | 2015-015794 A | 1/2015 |
| TW | I473409 B | 2/2015 |
| TW | 201611504 A | 3/2016 |

OTHER PUBLICATIONS

Office Action and Search Report dated Jun. 17, 2020, issued in related Chinese Application No. 201810801313.5, with English machine translation (19 pages).

* cited by examiner

SYSTEMS AND METHODS FOR PROVIDING INTELLIGENT CONSTANT ON-TIME CONTROL

CROSS-REFERENCE TO RELATED APPLICATIONS

This application is a divisional of U.S. patent application Ser. No. 15,965,257, filed Apr. 27, 2018, and entitled "SYSTEMS AND METHODS FOR PROVIDING INTELLIGENT CONSTANT ON-TIME CONTROL", which claims the benefit of U.S. Provisional Application Ser. No. 62/536,598, filed Jul. 25, 2017, and entitled "SYSTEMS AND METHODS FOR PROVIDING INTELLIGENT CONSTANT ON-TIME CONTROL." The entireties of the aforementioned applications are incorporated by reference herein.

TECHNICAL FIELD

This disclosure relates generally to on-time control, and more specifically to the providing intelligent constant on-time (COT) control.

BACKGROUND

Switching regulators with ripple-based control (i.e., "ripple regulators") may have fast transient response to both line and load perturbations. Specially, some ripple regulators may operate with a switching frequency that is proportional to the load current under the DCM (discontinuous conduction mode) and the transfer between CCM (continuous conduction mode) and DCM due to slow load changes may introduce only little output voltage overshoot or undershoot. Above characteristics may make these ripple regulators well-suited for power management application in computer and portable electronic devices. However, ripple regulators have some drawbacks, such as (1) tendency for large signal instability and noise-induced jitter (especially with ceramic output capacitor); (2) inadequate DC regulation; and (3) poorly defined switching frequency under CCM operation.

SUMMARY

One aspect of this disclosure is directed to a system for providing intelligent constant on-time control. The system may include a first switch coupled to a power input; a second switch coupled to the first switch; a switching node between the first switch and the second switch, the switching node configured to be connected to an inductor and a power output; feedback paths coupled to (1) the switching node and (2) the power output, the feedback paths enabling feedback of signals from (1) the switching node, and (2) the power output; and a processor coupled to the feedback paths. The processor may be configured to control a voltage at the power output based on a combination of the signals carried by the feedback paths.

One aspect of this disclosure is directed to a method for providing intelligent constant on-time control for a system comprising a first switch coupled to a power input; a second switch coupled to the first switch; a switching node between the first switch and the second switch, the switching node configured to be connected to an inductor and a power output; and feedback paths coupled to (1) the switching node and (2) the power output, the feedback paths enabling feedback of signals from (1) the switching node, and (2) the power output. A combination of the signals carried by the feedback paths may be received. A voltage at the power output may be controlled based on the combination of the signals carried by the feedback paths.

In some embodiments, an on-time of the first switch may be controlled based on the combination of the signals carried by the feedback paths. In some embodiments, the on-time may be dynamically generated in real time. In some embodiments, the on-time may be controlled by digitally changing a capacitance value, a current mirror ratio or a threshold voltage of the system via a phase-locked loop. In some embodiments, the phase-locked loop may include a sequential phase detector, a statement machine, and an n-bit bi-direction counter.

In some embodiments, a switching frequency of the first switch may be controlled based on the combination of the signals carried by the feedback paths.

In some embodiments, the combination of the signals carried by the feedback paths may include: (1) a first combination of a DC signal from the switching node and an AC signal from the power output, the first combination excluding a DC signal from the power output; and (2) a second combination of the DC signal from the power output and an AC signal from the first combination, the second combination excluding a DC signal from the first combination.

In some embodiments, the combination of the signals carried by the feedback paths may include: (1) a first combination of a DC signal from the switching node and an AC coupling to the ground, the first combination excluding a DC attenuation referenced to the ground; and (2) a second combination of a DC signal from the power output and an AC signal from the first combination, the second combination excluding a DC signal from the first combination.

In some embodiments, the voltage at the power output may be determined based on values of external resistors coupled to the system.

In some embodiments, an active error amplifier may be configured to amplify a ripple of the combination of the signals carried by the feedback paths.

In some embodiments, the feedback paths may, rather than being coupled to the switching node between the first switch and the second switch, be coupled to a synthesized node. The feedback paths may enable feedback of signals from (1) the synthesized node, and (2) the power output.

In some embodiments, the combination of the signals carried by the feedback paths may include: (1) a DC signal from the power output; and (2) an AC signal from the synthesized node. The combination may exclude a DC signal from the synthesized node. In some embodiments, the signals from the synthesized node may be provided by an inductor current emulator.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

Figure 1A:
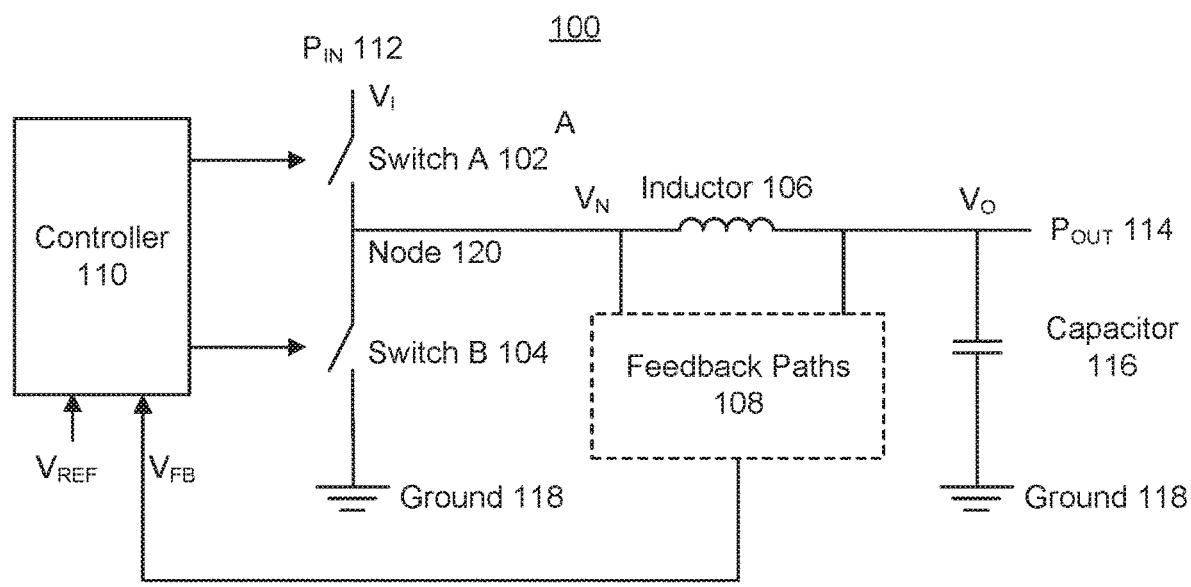
FIG. 1A illustrates an example system for providing intelligent constant on-time control in accordance with some implementations of the disclosure.

FIG. 1A illustrates an example system 100 for providing intelligent constant on-time control. The system 100 may include one or more of a switch A 102, a switch B 104, an inductor 106, feedback paths 108, a controller 110, and/or other components. One or more components of the system 100 may be coupled to one or more other components of the system 100. The term "coupling" as used herein may refer to direct coupling or indirect coupling. The switch A 102 may be coupled to a power input (PIN) 112, which provides an input voltage ($V_I$). The switch B 104 may be coupled to the switch A 102 and a ground 118. A node 120 (e.g., switching node) may exist between the switch A 102 and the switch B 104. The voltage at the node 120 may be referred to as the switching node voltage ($V_N$). The node 120 may be configured to be connected (e.g., via connector) to an inductor 106 and a power output ($P_{OUT}$) 114. The voltage at the power output 114 may be referred to as the output voltage ($V_O$). The power output 114 may be coupled to a capacitor 116 (e.g., an output capacitor), which may be coupled to the ground 118.

The feedback paths 108 may be coupled to (1) the node 120 and (2) the power output 114. The feedback paths 108 may enable feedback of signals from (1) the node 120, and (2) the power output 114. The controller 110 (e.g., ripple-based controller) may be coupled to the feedback paths 108. The controller 110 may receive a combination of signals carried by the feedback paths 108. For example, the controller 110 may receive a combination of voltage signals carried by the feedback paths 108. The voltage signal received by the controller 110 from the feedback paths 108 may be referred to as feedback voltage ($V_{FB}$). The controller 110 may be configured to compare the feedback voltage to a reference voltage ($V_{REF}$) and operate the switch A 102 and the switch B 104 based on the comparison. The operation of the switch A 102 and the switch B 104 by the controller 110 may control the output voltage ($V_O$), the switching frequency of the switch A 102/switch B 104, and/or the on-time of the switch A 102/switch B 104.

Figure 7:
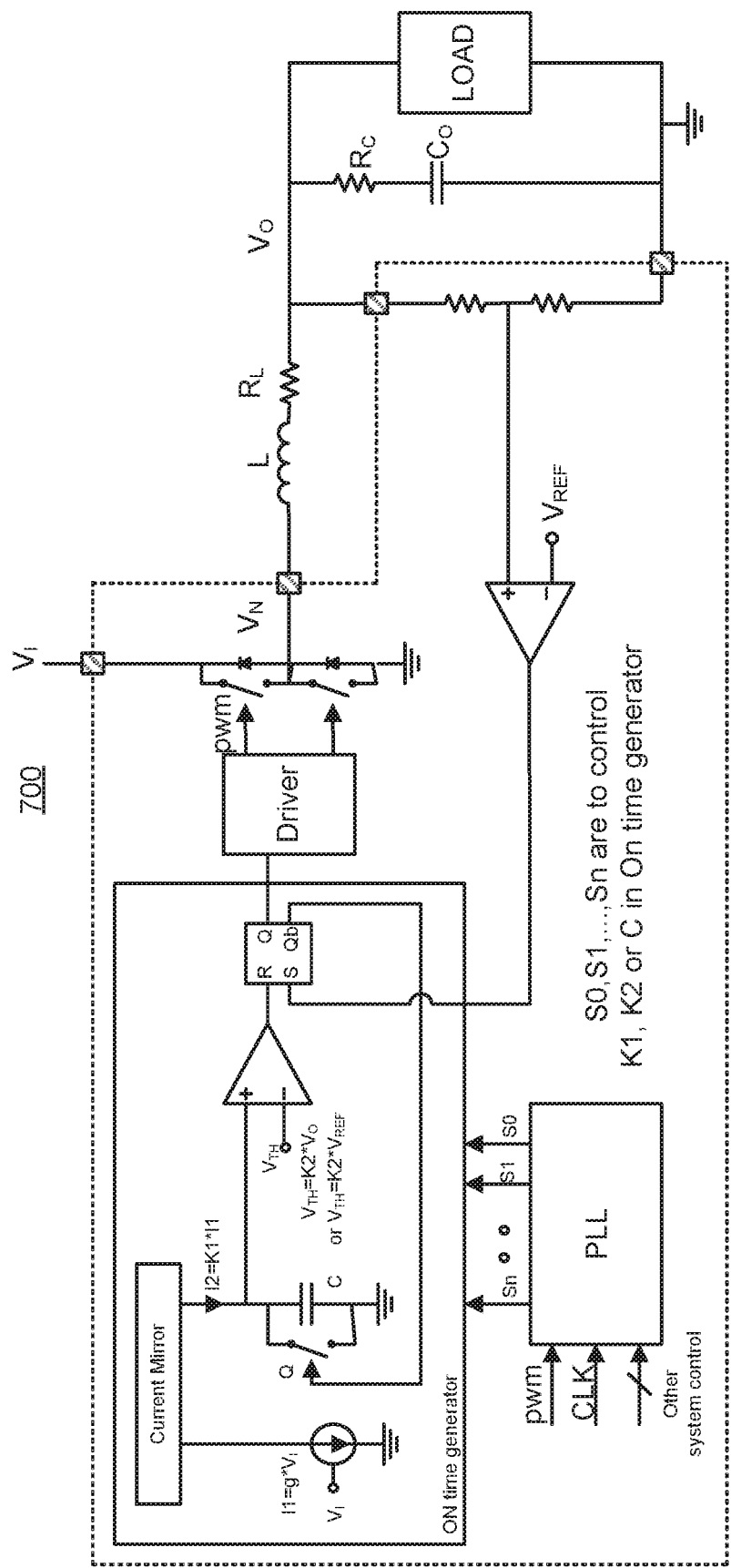
FIG. 7 illustrates an example system that reduces switching frequency variation.

In some embodiments, the on-time of the switch A 102/switch B 104 may be controlled by digitally changing a capacitance value, a current mirror ratio or a threshold voltage of the system 100 via a phase-locked loop (e.g., such as shown and described with respect to FIG. 7). In some embodiments, the on-time may be dynamically generated in real time (e.g., such as shown and described with respect to FIGS. 8-10). In some embodiments, the phase-locked loop may include a sequential phase detector, a statement machine, and an n-bit bi-direction counter (e.g., such as shown and described with respect to FIG. 11). One or more of the circuits/functionalities described herein may be combined together (e.g., such as shown and described with respect to FIG. 12).

Figure 1B:
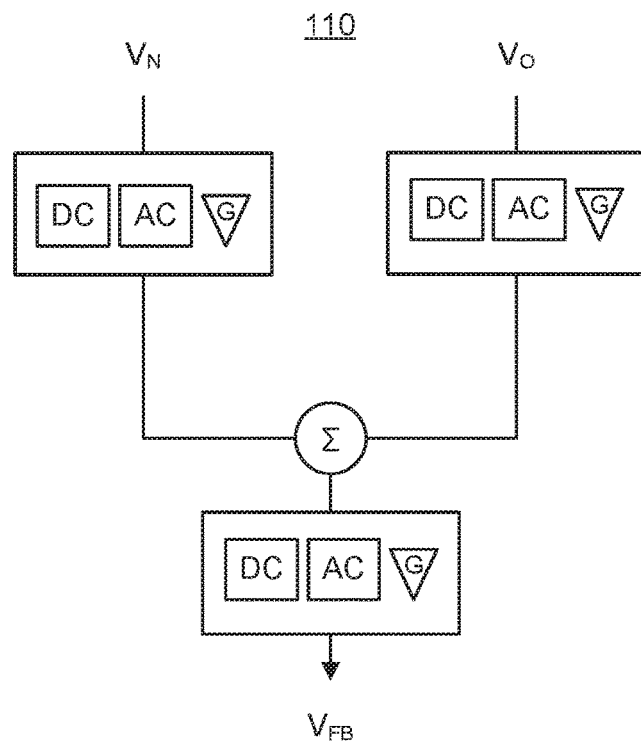
FIGS. 1B-1D illustrate example combinations of signals for providing intelligent constant on-time control in accordance with some implementations of the disclosure.
Figure 1D:
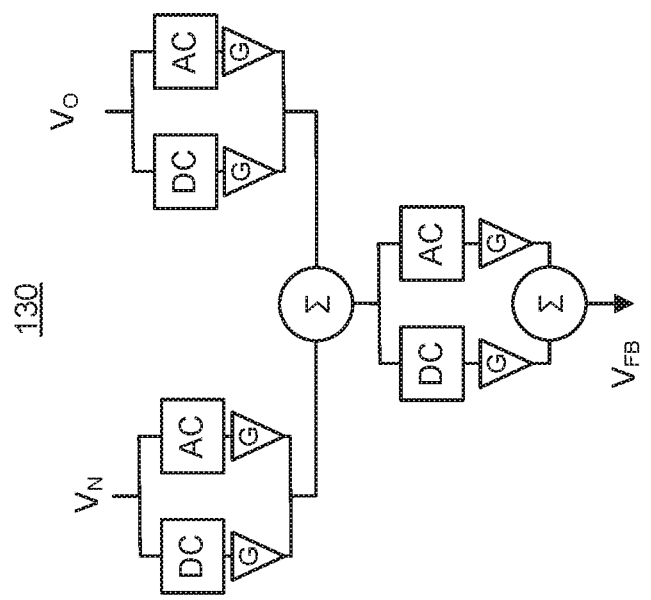
Figure 1C:
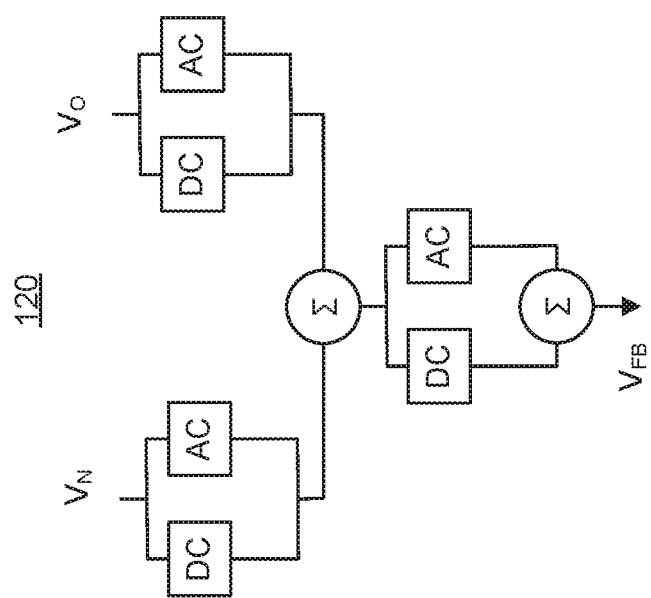

FIGS. 1B-1D illustrate example combinations of signals 110, 120, 130 for providing intelligent constant on-time control. Referring to FIG. 1B, the systems and methods disclosed herein may use different combinations of voltage signals from different parts of the system to provide intelligent constant on-time control. The combinations of voltage signals may include a DC component of the switching node voltage, an AC component of the switching node voltage, a DC component of the output voltage, an AC component of the output voltage, a DC component of a combination of the switching node voltage and the output voltage, an AC component of a combination of the switching node voltage and the output voltage, and/or other signals. One or more components of the voltage signals may be scaled down (e.g., via a feedback voltage divider resistors) or scaled up (e.g., boosted via a gain). The combinations of the voltage signals may be provided to a ripple-based controller (e.g., the controller 110) as feedback voltage.

Referring to FIG. 1C, the feedback voltage may be provided by combining (1) DC and/or AC components of the switching node voltage, and DC and/or AC components of the output voltage, and providing (2) DC and/or AC components of the combined voltages. Referring to FIG. 1D, one or more of the components may be scaled up via a gain (G). Individual gains shown in FIG. 1D may be optional—that is one or more components of the signals may be scales up while one or more components of the signals may not be scaled up.

Figure 2A:
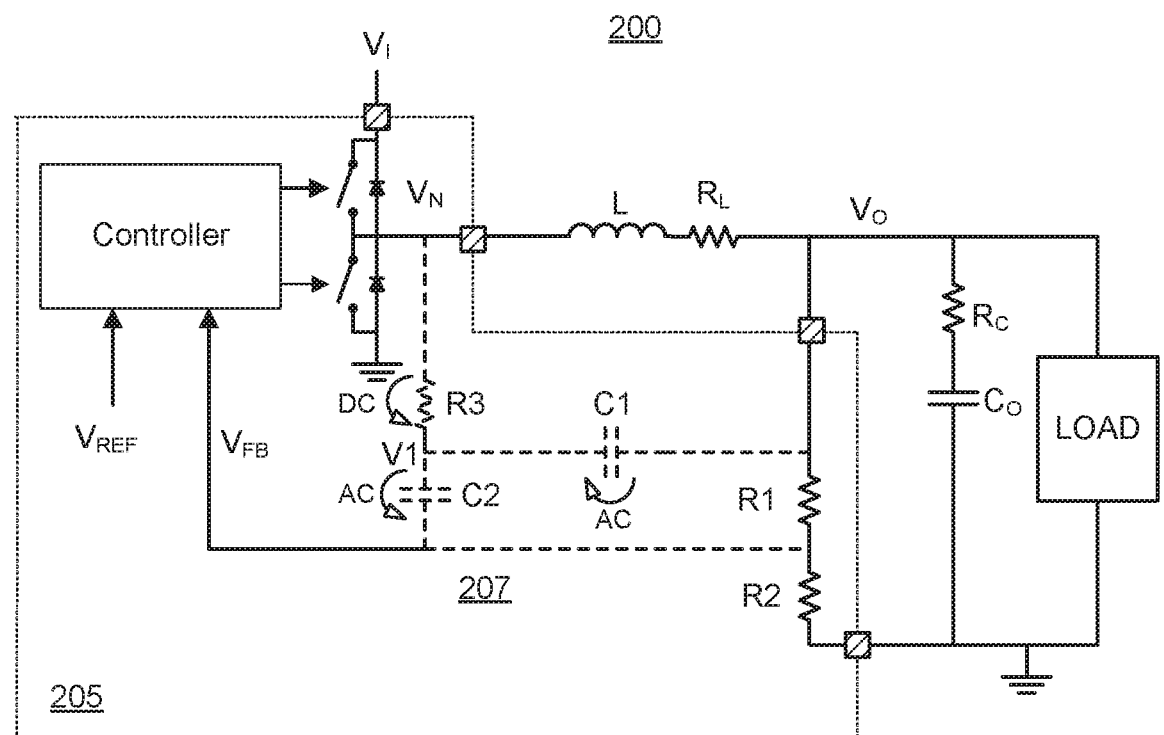
FIG. 2A-2B illustrate example systems for providing intelligent constant on-time control in accordance with some implementations of the disclosure.
Figure 2B:
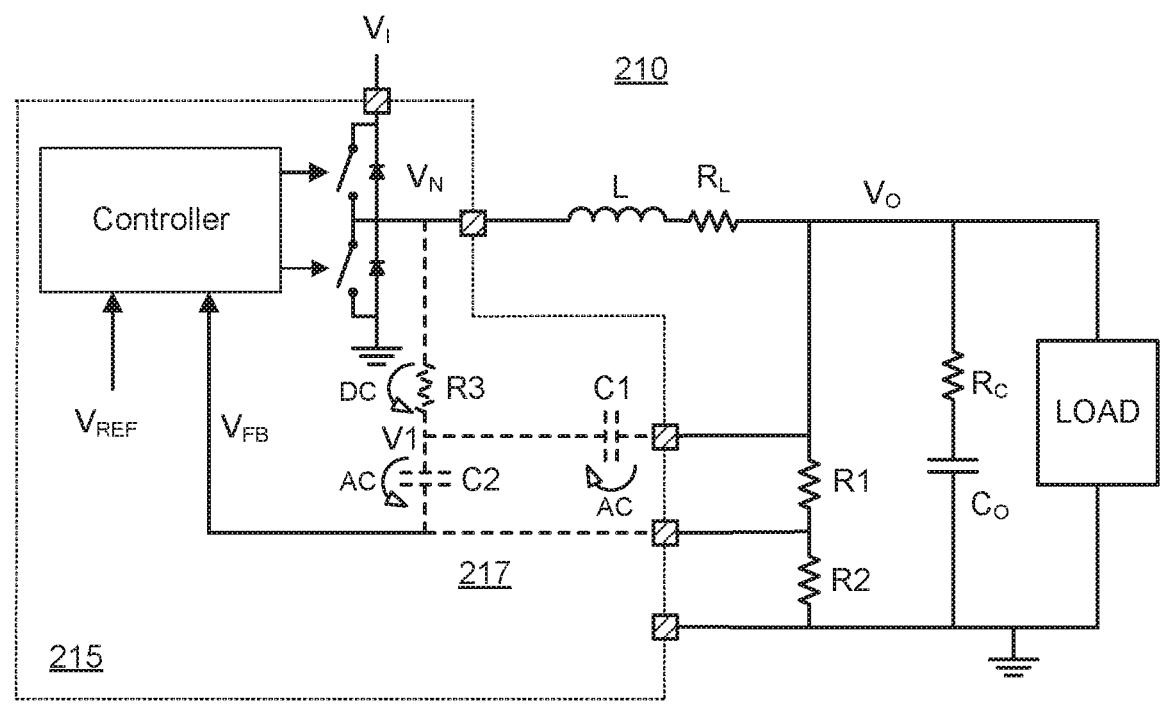

FIG. 2A-2B illustrate example systems 200, 210 for providing intelligent constant on-time control. Referring to FIG. 2A, the circuit shown inside polygon 205 may be integrated monolithically in a chip. Referring to FIG. 2B, the circuit shown inside polygon 215 may be integrated monolithically in a chip. The output voltage of the systems 200, 210 may be varied by changing the reference voltage or by changing values of divider resistors (R1, R2). The divider resistors may be implemented internally within a chip (e.g., via non-volatile memory/fuses), such as shown in the system 200, or may be implemented via external discrete resistors, such as shown in the system 210. As shown in FIG. 2B, the use of external resistors may require the chip to have an additional pin (e.g., an additional pin to connect to the divided output voltage).

The feedback paths 207, 217 of the systems 200, 210 may be shown in dashed lines in FIGS. 2A-2B, respectively. The feedback paths 207, 217 may include a path carrying the node voltage through a resistor (R3), a path carrying the output voltage through a capacitor (C1), a path carrying a combination of the node voltage and the output voltage through a capacitor (C2), a path carrying the output voltage (reduced via divider resistors), and/or other paths. Capacitors in the feedback paths may allow AC components of the signals to pass through while blocking DC components of the signals. Resisters in the feedback paths may allow DC and AC components of the signals to pass through. The DC components may be much larger than the AC components of the signals, and passing both DC and AC components may be treated as passing just the DC components (e.g., effectively blocking the AC components).

The combination of signals carried by the feedbacks 207, 217 path may enable the controller of the systems 200, 210 to improve stability and noise-immunity of the systems 200, 210. The combination of the resistor (R3) and the capacitor (C1) (across the inductor (L)) on the feedback paths 207, 217 may generate a triangle ripple signal at V1, which synchronizes waveform of the inductor current The triangle ripple signal at V1 may have an amplitude of about tens of millivolts. This waveform may be injected through the capacitor (C2) so that the feedback voltage may have nearly the same amplitude ripple as V1. The time constant of filter (R3 and C1) is not be constrained by the inductor time constant ($R_L/L$) and not need to match the inductor time constant ($R_L/L$). The ripple amplitude of the feedback voltage is insensitive to $R_C$ and $R_L$. The systems 200, 210 may operate even if the value(s) of $R_C$ and $R_L$ go to zero.

Figure 2C:
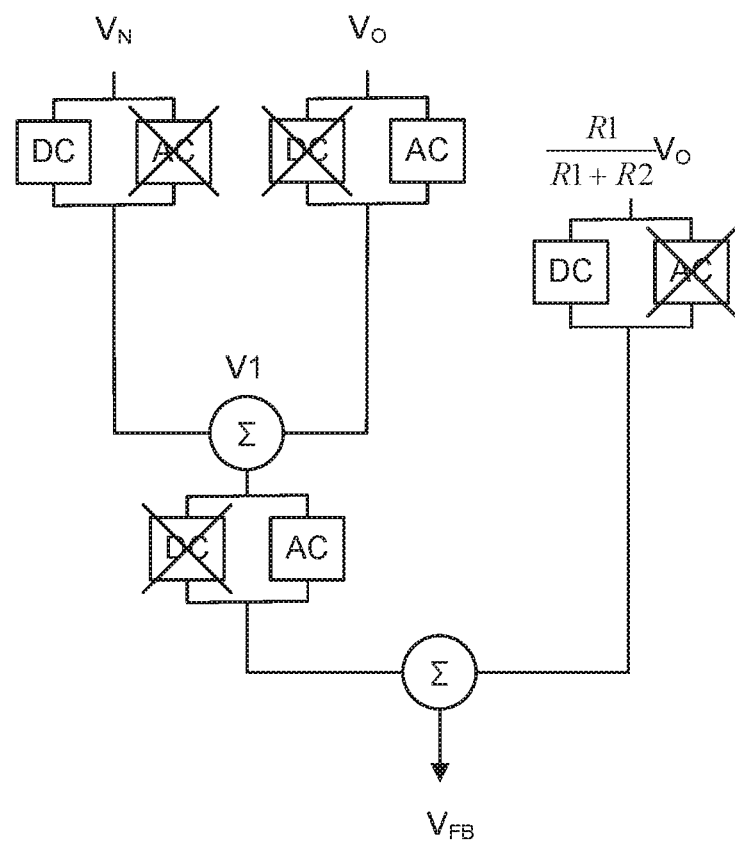
FIG. 2C illustrates an example combination of signals for providing intelligent constant on-time control with respect to the systems shown in FIGS. 2A-2B in accordance with some implementations of the disclosure.

FIG. 2C illustrates an example combination of signals 220 carried by the feedback paths 207, 217 with respect to the systems 200, 210. The combination of signals 220 may include a first combination (V1) of the DC component of the node voltage and the AC component of the output voltage. The first combination may effectively exclude the AC component of the node voltage (via resistor R3). The first combination may exclude the DC component of the output voltage (via capacitor C1). The combination of signals 220 may include a second combination of the DC component of the reduced (via divider resistors R1, R2) output voltage and the AC component of the first combination (V1). The second combination may exclude the DC component of the first combination (via capacitor C2). The second combination may effectively exclude the AC component of the output voltage (via resistors R1, R2)

Figure 3A:
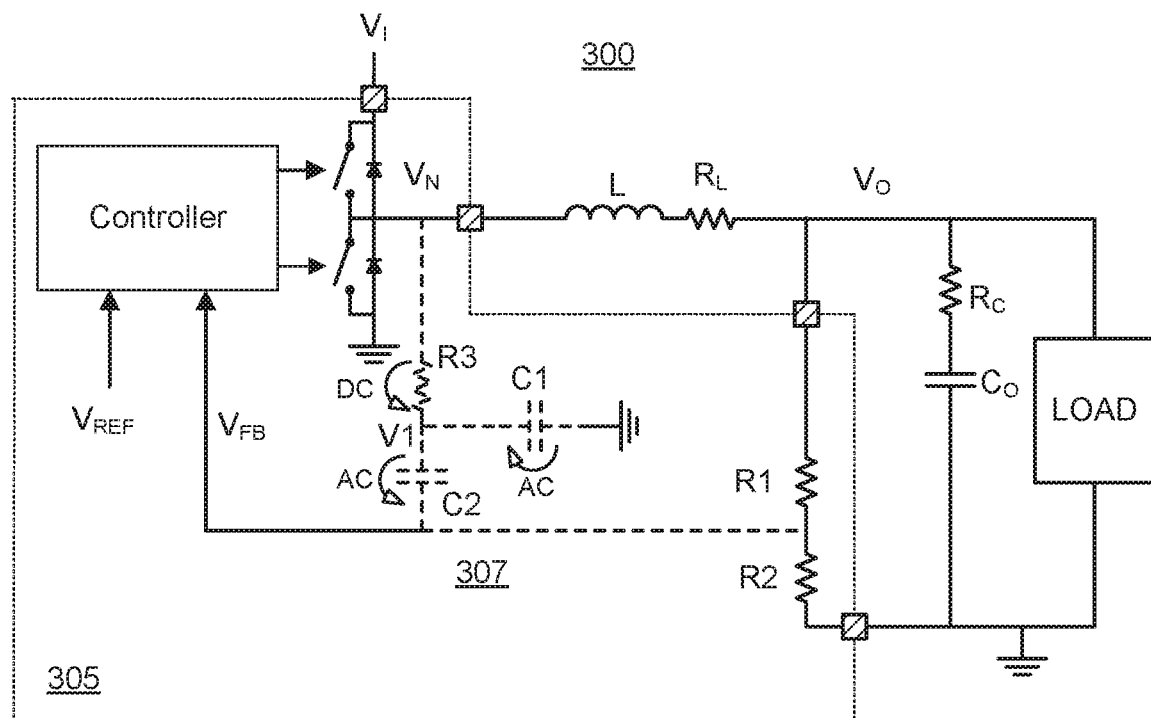
FIG. 3A-3B illustrate example systems for providing intelligent constant on-time control in accordance with some implementations of the disclosure.
Figure 3B:
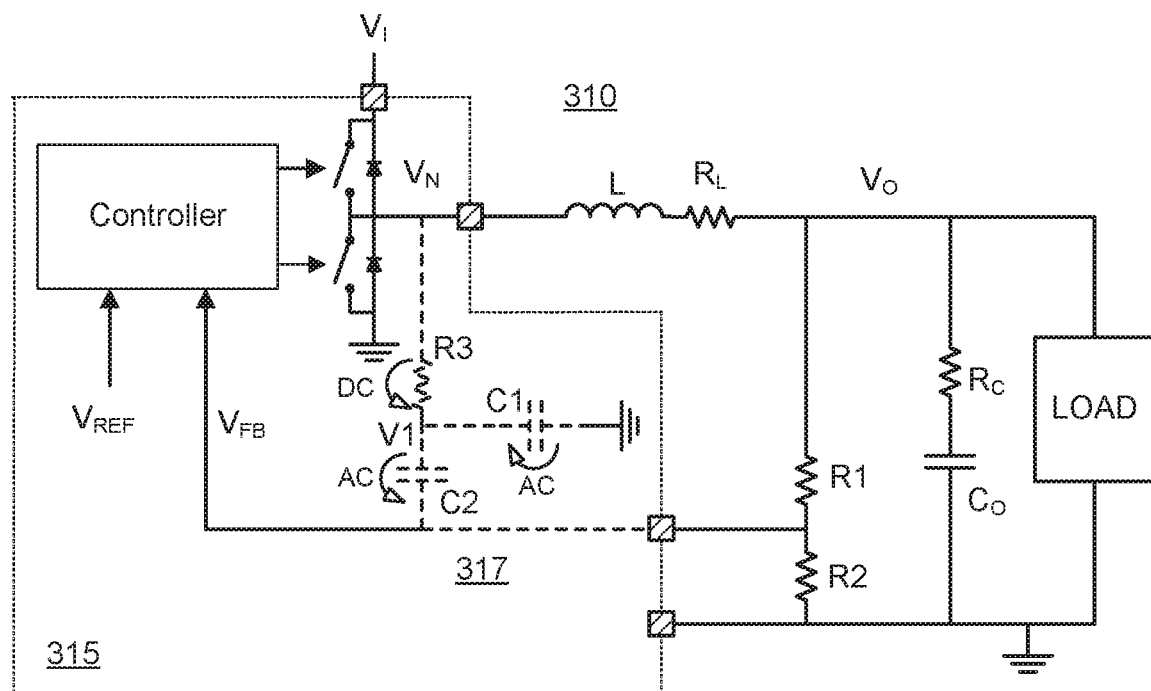

FIG. 3A-3B illustrate example systems 300, 310 for providing intelligent constant on-time control. Referring to FIG. 3A, the circuit shown inside polygon 305 may be integrated monolithically in a chip. Referring to FIG. 3B, the circuit shown inside polygon 315 may be integrated monolithically in a chip. The output voltage of the systems 300, 310 may be varied by changing the reference voltage or by changing values of divider resistors (R1, R2). The divider resistors may be implemented internally within a chip (e.g., via non-volatile memory/fuses), such as shown in the system 300, or may be implemented via external discrete resistors, such as shown in the system 310. As shown in FIG. 3B, the use of external resistors may not require the chip to have an additional pin (compared to the additional pin required in the system 210).

The combination of signals carried by the feedback paths 307, 317 may enable the controller of the systems 300, 310 to improve stability and noise-immunity of the systems 300, 310. The combination of the resistor (R3) and the capacitor (C1) (connected to the ground) on the feedback paths 307, 317 may generate a triangle ripple signal at V1, which synchronizes waveform of the inductor current The triangle ripple signal at V1 may have an amplitude of about tens of millivolts. This waveform may be injected through the capacitor (C2) so that the feedback voltage may have nearly the same amplitude ripple as V1. The time constant of filter (R3 and C1) may not be constrained by the inductor time constant ($R_L/L$) and may not need to match the inductor time constant ($R_L/L$). The ripple amplitude of the feedback voltage may be insensitive to $R_C$ and $R_L$. The systems 300, 310 may operate even if the value(s) of $R_C$ and $R_L$ go to zero.

The transient behavior of the systems 300, 310 may not be as good as the transient behavior of the systems 200, 210. This is due to the feedback voltage in systems 300, 310 not having inductor (L) current information as in the systems 200, 210. The systems 300, 310 may provide for simpler chip design/smaller chip size than the systems 200, 210.

The feedback paths 307, 317 of the systems 300, 310 may be shown in dashed lines in FIGS. 3A-3B, respectively. The feedback paths 307, 317 may include a path carrying the node voltage through a resistor (R3), a path with AC coupling to ground through a capacitor (C1), a path carrying the filtered switching node voltage, a path carrying the output voltage (reduced via divider resistors), and/or other paths.

Figure 3C:
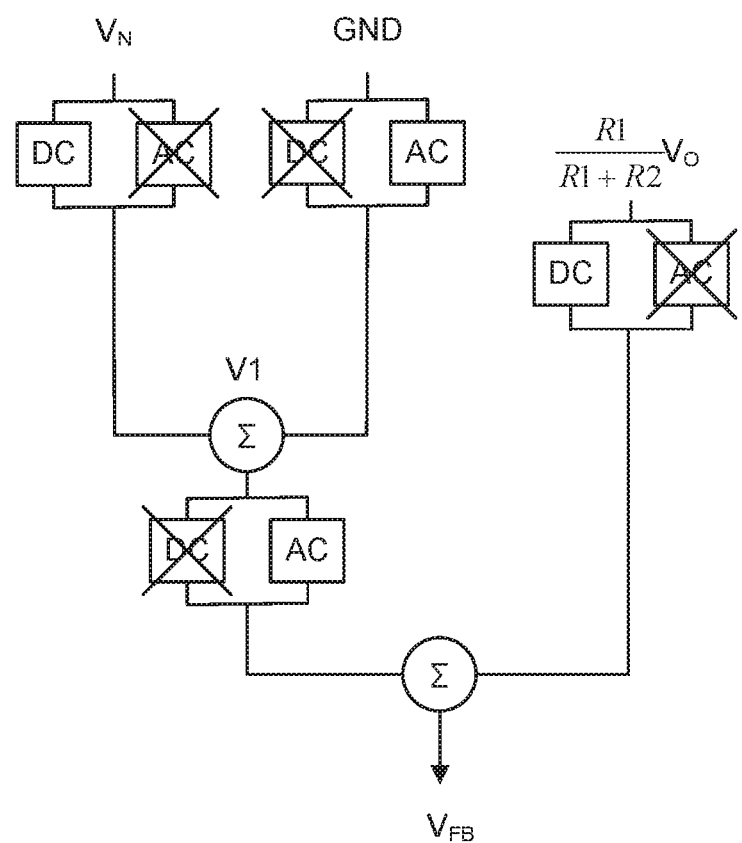
FIG. 3C illustrates an example combination of signals for providing intelligent constant on-time control with respect to the systems shown in FIGS. 3A-3B in accordance with some implementations of the disclosure.

FIG. 3C illustrates an example combination of signals 320 carried by the feedback paths 307, 317 with respect to the systems 300, 310. The combination of signals 320 may include a first combination (V1) of the DC component of the switching node voltage and the AC coupling to the ground. The first combination may effectively exclude the AC component of the node voltage (via resistor R3). The first combination may exclude the DC attenuation referenced to ground (via capacitor C1). The combination of signals 320 may include a second combination of the DC component of the reduced (via divider resistors R1, R2) output voltage and the AC component of the first combination (V1). The second combination may exclude the DC component the first combination (via capacitor C2). The second combination may effectively exclude the AC component of the output voltage (via resistors R1, R2).

Figure 4A:
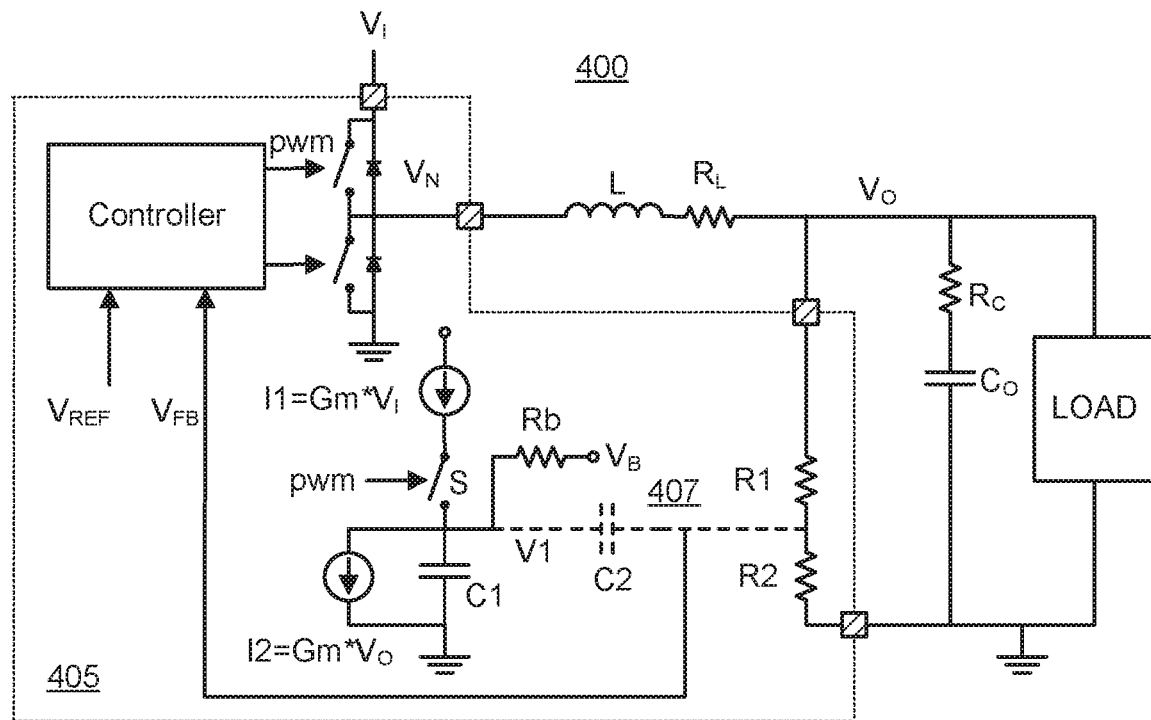
FIG. 4A-4B illustrate example systems for providing intelligent constant on-time control in accordance with some implementations of the disclosure.
Figure 4B:
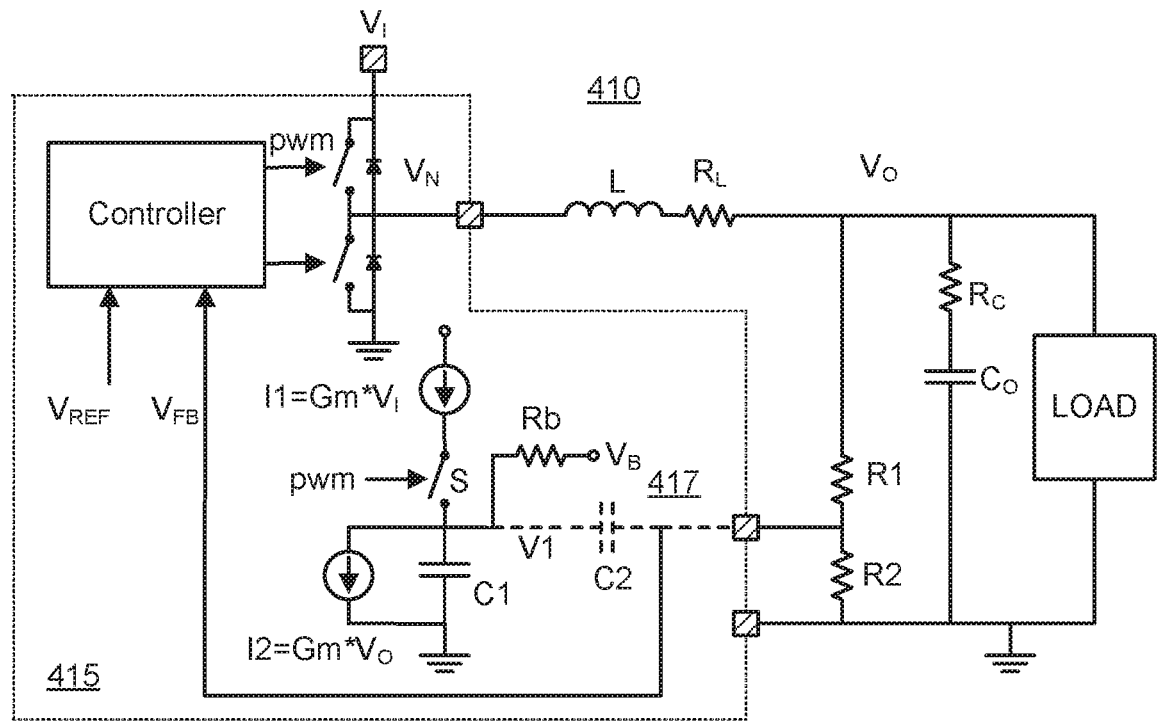

Referring to FIG. 1A, in some embodiments, the feedback paths 108 may, rather than being coupled to the switching node 120 (between the switch A 102 and the switch B 104), be coupled to a synthesized node. The synthesized node may emulate the variations of signals at the node 120. For example, FIG. 4A-4B illustrate example systems 400, 410 for providing intelligent constant on-time control using synthesized nodes. Referring to FIG. 4A, the circuit shown inside polygon 405 may be integrated monolithically in a chip. Referring to FIG. 4B, the circuit shown inside polygon 415 may be integrated monolithically in a chip. The output voltage of the systems 400, 410 may be varied by changing the reference voltage or by changing values of divider resistors (R1, R2). The divider resistors may be implemented internally within a chip (e.g., via non-volatile memory/fuses), such as shown in the system 400, or may be implemented via external discrete resistors, such as shown in the system 410. As shown in FIG. 4B, the use of external resistors may not require the chip to have an additional pin (compared to the additional pin required in the system 210).

The feedback paths 407, 417 of the systems 400, 410 may be shown in dashed lines in FIGS. 4A-4B, respectively. The feedback paths 407, 417 may include a path carrying the voltage at the synthesized node (V1) through a capacitor (C2), a path carrying the output voltage (reduced via divider resistors), and/or other paths. The voltage at the synthesized node may be referred to as the synthesized node voltage (V1). The synthesized voltage may be provided by an inductor current emulator. An example inductor current emulator is shown in FIGS. 4A-4B, comprising two current sources (I1, I2), a switch (S), a capacitor (C1), and a resistor (Rb), with a DC bias ($V_B$). Other types of inductor current emulators are contemplated. The feedback paths 407, 417 may enable feedback of signals from (1) the synthesized node, and (2) the power output.

The systems 400, 410 may employ an active circuit to generate ripple signal to obtain better inductor (L) current information. In systems 400, 410, the inductor current emulator may generate a ripple voltage V1, which follows the inductor current waveform and has a DC bias $V_B$. The current sources (I1, I2) may include active analog circuits which generate currents charge and discharge for the capacitor (C1). To make the V1 waveform follow the inductor waveform, I1 current may be made proportional to $V_I$ (e.g., I1=Gm*$V_I$) and I2 current may be made proportional to $V_O$ (e.g., I2=Gm*$V_O$). Switch (S) may synchronize to high side control signal (pwm). This may generate a waveform V1 having a ripple with amplitude of tens of millivolts. This waveform may be injected through the capacitor (C2) so that the feedback voltage may have nearly the same amplitude ripple as V1. The ripple amplitude of the feedback voltage may be insensitive to $R_C$ and $R_L$. The systems 400, 410 may operate even if the value(s) of $R_C$ and $R_L$ go to zero.

Compared to the systems 200, 210 shown in FIGS. 2A, 2B and the systems 300, 310 shown in FIGS. 3A, 3B, the systems 400, 410 may result in better inductor (L) current information in the V1 waveform, which may be used to implement other control functions.

Figure 4C:
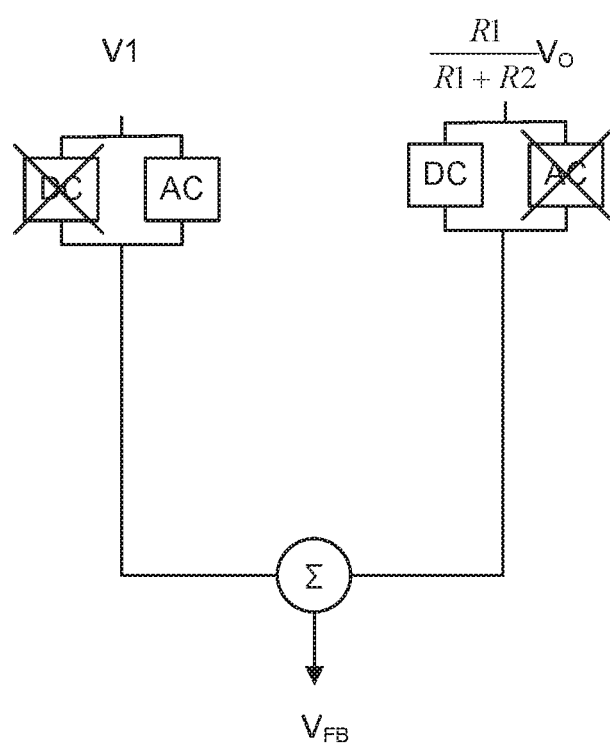
FIG. 4C illustrates an example combination of signals for providing intelligent constant on-time control with respect to the systems shown in FIGS. 4A-4B in accordance with some implementations of the disclosure.

FIG. 4C illustrates an example combination of signals 420 carried by the feedback paths 407, 417 with respect to the systems 400, 410. The combination of signals 420 may include a combination of the AC component of the synthesized node voltage and the DC component of the reduced (via divider resistors R1, R2) output voltage. The combination may exclude the DC component of the synthesized node voltage (via capacitor C2). The combination may effectively exclude the AC component of the output voltage (via resistors R1, R2).

In some embodiments, a system may include one or more of the designs/functionalities of the systems 200, 210, 300, 310, 400, 410. For example, a chip may be programmed (via hardware/firmware/software) to be able to flexibly change between the designs/functionalities shown in the systems 200, 210, 300, 310, 400, 410. Based on the needs of the power system and/or power constraints, the chip may be used to provide higher/lower stability and noise-immunity. In some embodiments, the system may be further configured to boost one of more signals (e.g., via gain G).

Figure 5A:
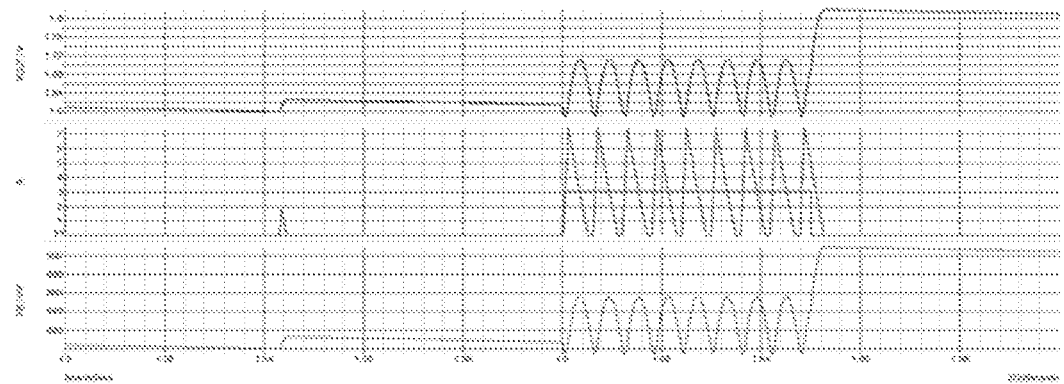
FIG. 5A illustrates example signals without intelligent constant on-time control.
Figure 5B:
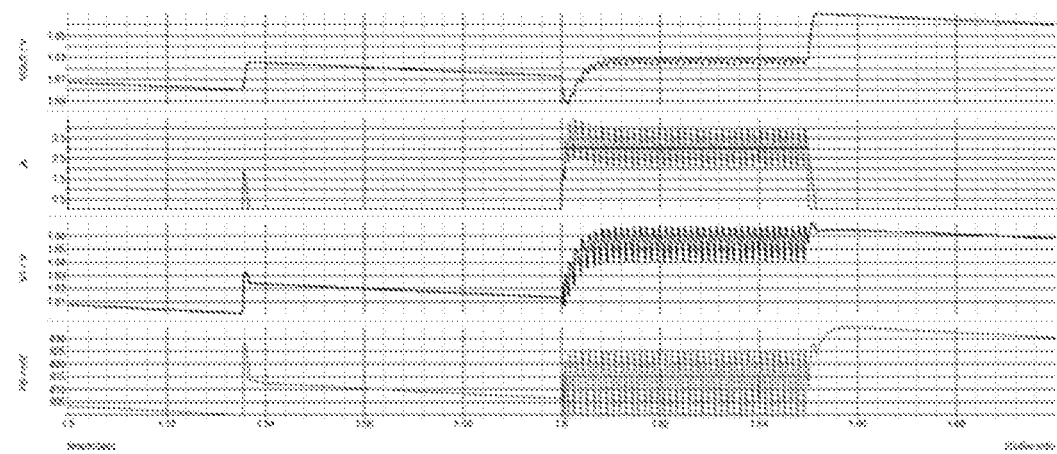
FIG. 5B illustrates example signals with intelligent constant on-time control.

FIGS. 5A-5B illustrate effectiveness of the systems 200, 210. FIG. 5A illustrates example signals without intelligent constant on-time control. FIG. 5B illustrates example signals with intelligent constant on-time control, as implemented in systems 200, 210. In FIGS. 5A and 5B, the load on the systems change from 10 mA to 3 A at 1.6 ms and change back from 3 A to 10 mA at 1.65 ms. The input voltage ($V_I$) may be 12V, and the output voltage ($V_O$) is 1.6V. The inductor inductance (L) is 1 uH and the inductor resistance ($R_L$) is be 0Ω. The output capacitance ($C_O$) is 44 uF and the capacitor resistance ($R_C$) is 1 mΩ. FIG. 5A shows (from top to bottom), the output voltage ($V_O$), the inductor current, and the feedback voltage ($V_{FB}$). FIG. 5B shows (from top to bottom), the output voltage ($V_O$), the inductor current, V1 voltage, and the feedback voltage ($V_{FB}$). As shown in FIG. 5A, with above conditions and parameters, the COT control is not stable. As shown in FIG. 5B, the intelligent COT control is stable.

Figure 6:
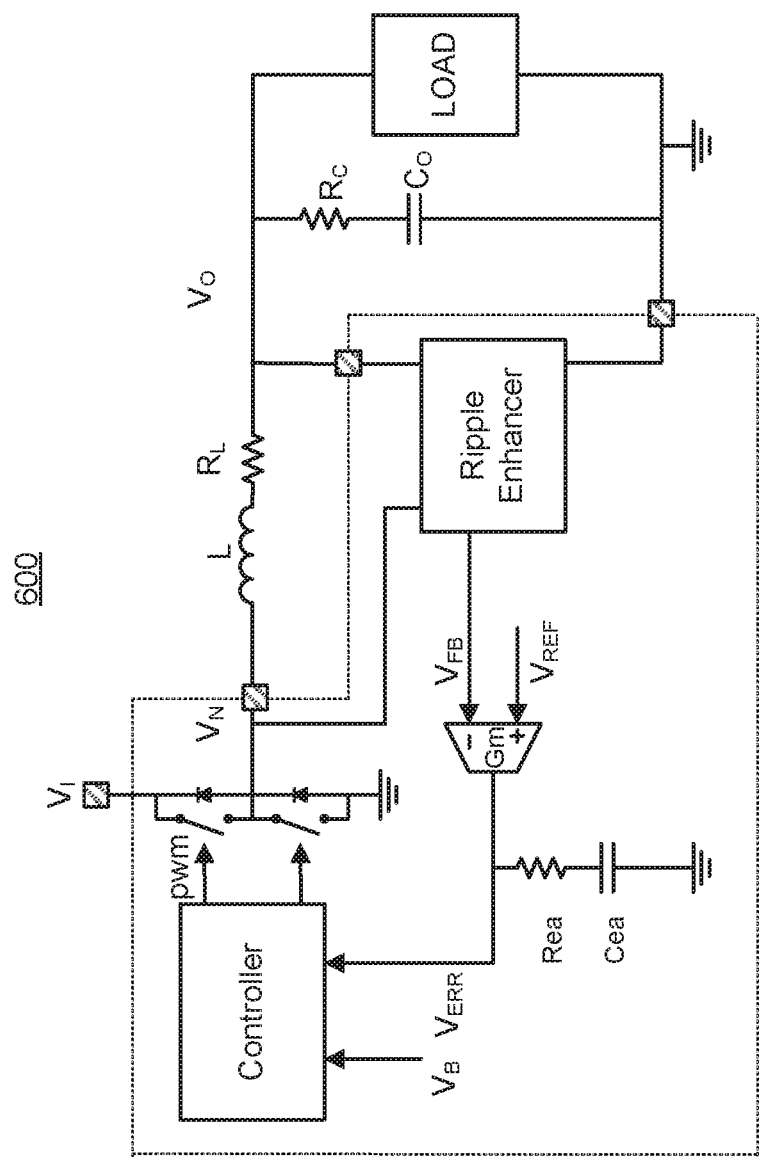
FIG. 6 illustrates an example system that improves ripple regulator's DC accuracy.

In some embodiments, one or more active error amplifiers may be configured to amplify one or more ripples of the combination of the signals carried by the feedback paths. For example, FIG. 6 illustrates a system 600 that improves the DC accuracy of a ripple regulator. Use of the ripple enhancement techniques shown in FIGS. 2A-2B, 3A-3B, and 4A-4B may enable the use of a simple amplifier configuration to improve a ripple regulator's DC accuracy. In FIG. 6, an error amplifier (Gm) and a compensation capacitor (Cea) and a compensation resistance (Rea) may be placed between the feedback paths and the ripple-based controller to improve DC regulation. The ripple enhancer may include the circuits/functionalities shown in FIG. 2A-2B, 3A-3B, or 4A-4B. The inputs to the controller may be changed to be $V_B$ and $V_{ERR}$, where $V_B$ is used to position the output voltage $V_{ERR}$ of the error amplifier within a certain (e.g., convenient) range. $V_{REF}$ may be provided to the error amplifier, rather than being provided to the controller. The amplifier (Gm) in the systems 600, 610 may serve as: (1) a high DC-gain voltage-error amplifier for accurate DC regulation; and (2) an amplifier for the ripple voltage coming from the ripple enhancer. The ripple enhancer may be used to generate (e.g., tens of millivolt) ripple to synchronize to the inductor current. The amplifier may boost the ripple (e.g., to hundreds of millivolt) so that the ripple may be more easily processed by the ripple-based controller.

The selection of values for resistor (Res) and capacitor (Ces) is simple because the error amplifier (Gm) and the ripple enhancer are decoupled in the system 600. The values for the resistor (Res) and the capacitor (Ces) may be chosen to create a zero much lower than the regulator's switching frequency. The parasitic capacitance at the output of the error amplifier (Gm) may need to kept to a minimum to allow the system 600 to ignore the parasitic pole effect to the shape of the ripple.

To improve COT ripple regulator, for first order, constant switching frequency operation at CCM may be achieved by making the on-time proportional to the reciprocal of the input voltage and making the on-time proportional to the output voltage. However, second order effects (e.g., efficiency of the regulator, comparator delay, driver delay) may still affect the switching frequency. For multi-MHz high frequency operations, these second order effect may cause more than 20% switching frequency variations.

FIG. 7 illustrates an example system 700 that reduces switching frequency variation. In the system 700, the on-time of the switches may be varied by changing (1) the current mirror ratio K1 (I2=K1*I1); (2) the capacitance value C and (3) the threshold ($V_{TH}$). The on-time may be made inversely proportional to the input voltage ($V_I$) by making I1 and I2 proportional to $V_I$. For the first order, the switching frequency may not change with $V_I$. The on-time may also be made proportional to $V_O$ or $V_{REF}$ ($V_O$ target divided by a feedback ratio) by making the threshold voltage ($V_{TH}$) proportional to $V_O$ or $V_{REF}$. For the first order, the switching frequency may not change with $V_O$.

Based on the system 700, the on-time may be calculated as:

$$Ton = \left(\frac{Vo}{Vin}\right) \cdot \left(\frac{K2 \cdot C}{K1 \cdot g}\right) - Td$$

This may result in the switching frequency being calculated as:

$$Fsw = \frac{\frac{1}{\eta}}{\left(\frac{K2 \cdot C}{K1 \cdot g}\right) - Td \cdot \left(\frac{Vin}{Vo}\right)}$$

In the above equations, Td may represent the total delay of comparator and driver, and η may represent regulator efficiency. If Td is close to 0 and η close to 1, $F_{SW}$ may be close to a constant and insensitive to both input voltage ($V_I$) and output voltage ($V_O$).

Figure 8:
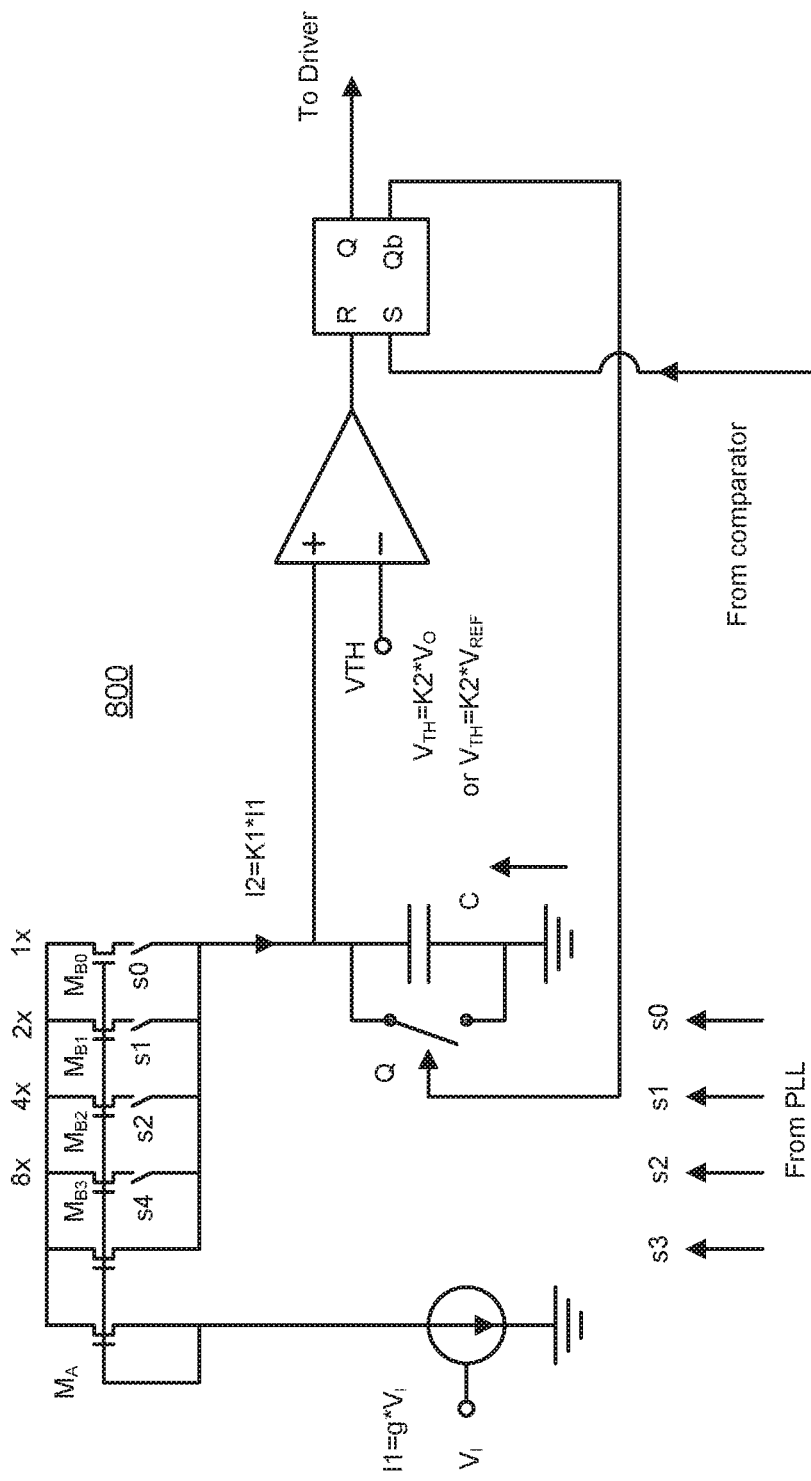
FIGS. 8-10 illustrate example circuits to implement ON time generator in FIG. 7.
Figure 9:
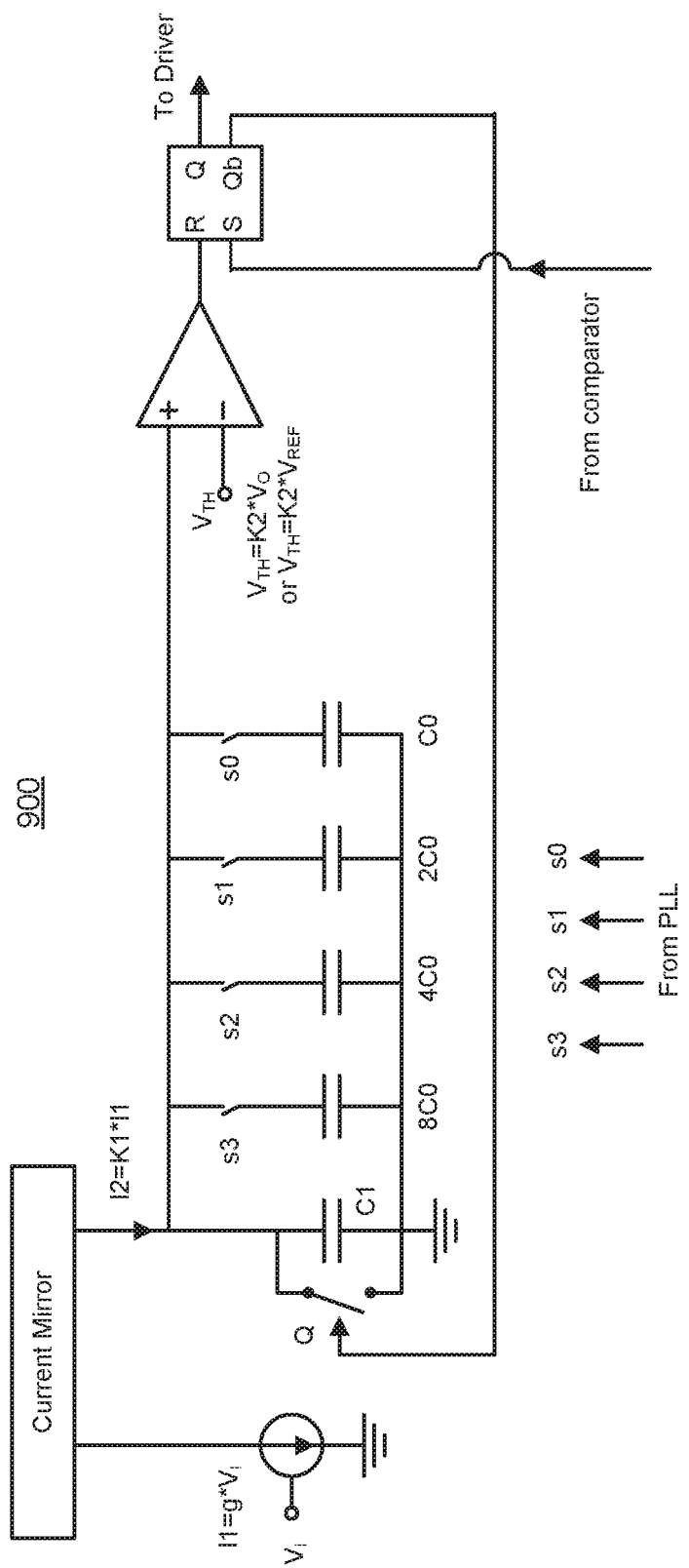
Figure 10:
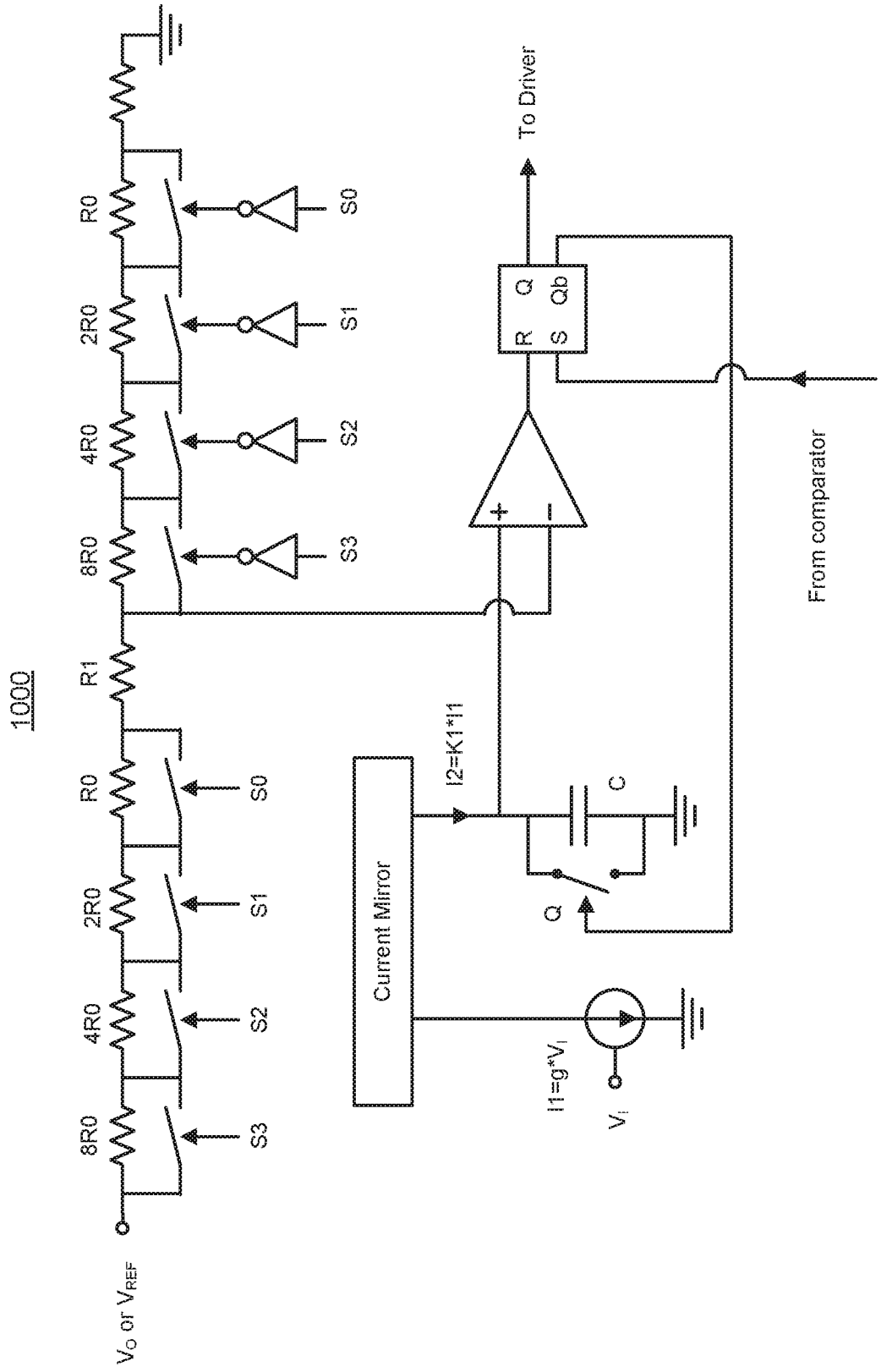

For some applications, CCM switching frequency accuracy may be critical, and a PLL loop may be added to remove second order effect of switching frequency variation. As shown in FIG. 7, a PLL may compare the phase between a pwm signal and an accuracy clock (generated inside or outside of the chip). The output of the PLL may be a n-bit digital signal. The n-bit digital signal may be used to generate/trim the ON time on the fly. FIGS. 8-10 illustrate example circuits 800, 900, 1000 to implement the ON time generator in FIG. 7. The circuits shown in FIGS. 8-10 may be used to dynamically generate on-time in real time. The dynamic trimming may be performed by trimming the current mirror ratio K1 as shown in FIG. 8, by trimming the capacitor size as shown in FIG. 9, or by trimming K2 (multiplier to $V_O$ or $V_{REF}$ for $V_{TH}$) as shown in FIG. 10. In FIG. 10, a four-bit control S<3:0> is provided as an example. Different number of bits may be used based on the specific requirements of switching frequency accuracy.

Figure 11:
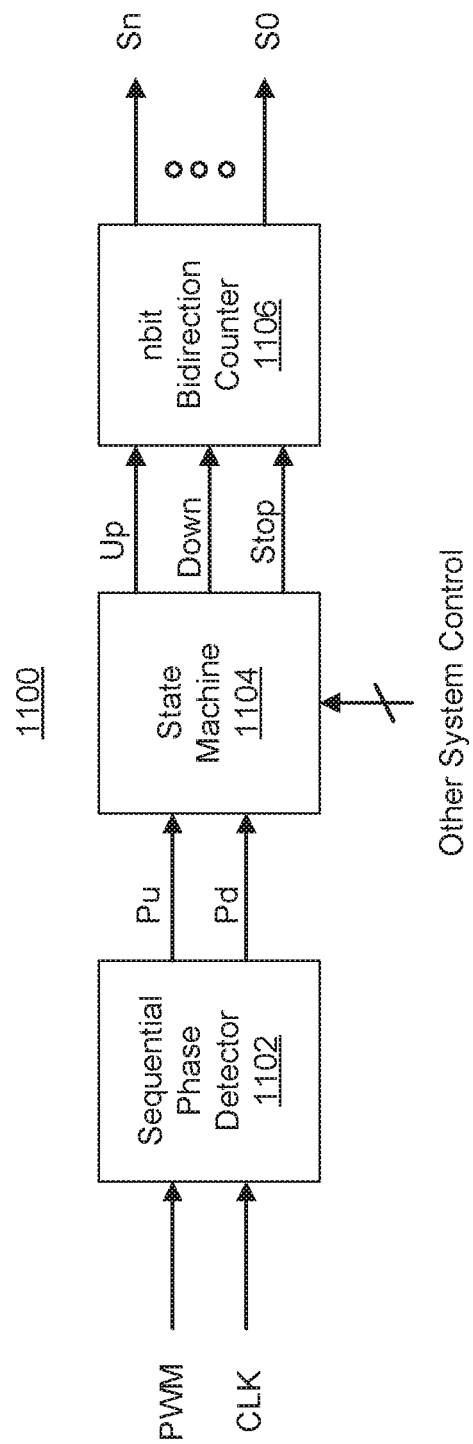
FIG. 11 illustrates an example block diagram to implement PLL in FIG. 7.

FIG. 11 illustrates an example block diagram 1100 to implement the PLL in FIG. 7. The phase-locked loop may include a sequential phase detector 1102, a statement machine 1104, and an n-bit bi-direction counter 1106. The sequential phase detector 1102 may be configured to detect the phase difference of a pwm signal and an accuracy clock. The outputs of the sequential phase detector 1102 (pu and pd signals) may reflect the phase difference between the pwm signal and the accuracy clock. For example, if the pwm signal is at much higher frequency than the accuracy clock, the pu signal may be mostly at '1' and the pd signal may be mostly at '0.' If the pwm signal and accuracy clock have the same frequency, the time of the pu signal may be split equally between '1' and '0', and the time of the pd signal may be split equally be '1' and '0.' If the pwm signal is at much lower frequency than accuracy clock, the pu signal may be mostly at '0' and the pd signal may be mostly at '1'.

The state machine 1104 may be used to generate three control signals "up", "down" and "stop" to control the n-bit bi-direction counter 1106 based on the "pu" and "pd" signals and other system control signal(s). For example, other system control signal may be "DCM," and when a chip is operating in DCM, the PLL loop may be stopped. The output of nbit bi-direction counter 1106 (e.g., S<N:0>) may directly control the parameters in the on-time generator. The outputs of the state machine 1104 may control the nbit bi-direction counter 1106 to count up, count down, or stop counting. The proposed PLL may be implemented digitally and may have no DC current consumption.

Figure 12:
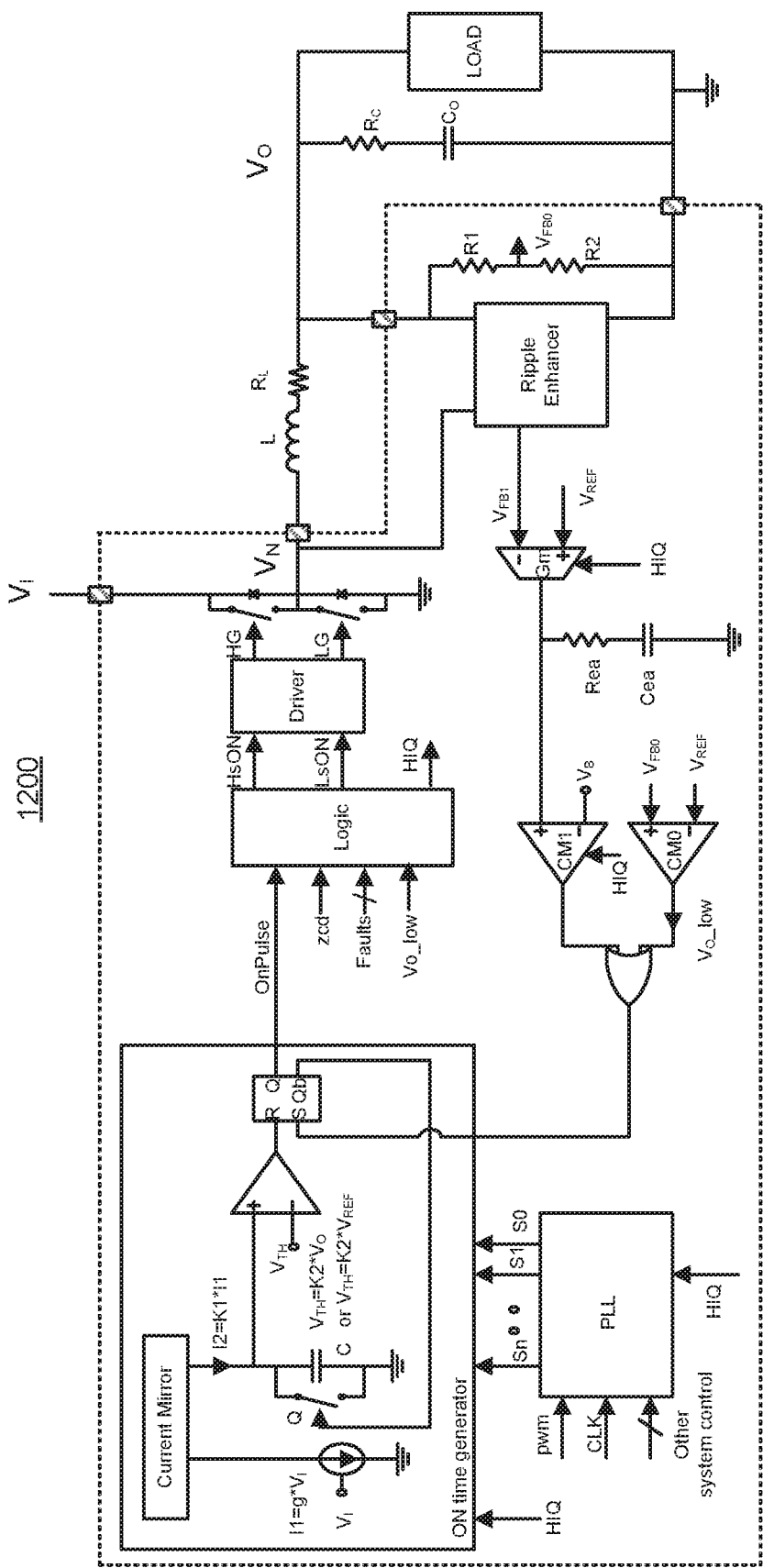
FIG. 12 illustrates an example ripple regulator architecture.

FIG. 12 illustrates an example ripple regulator architecture 1200 to provide robust intelligent COT control. The ripple regulator architecture 1200 may include one or more of the circuits/functionalities shown in FIGS. 2A-2C, 3A-3C, 4A-4C, 6, 7, 8, 9, 10, 11. In FIG. 12, a ripple enhancer may be configured to enhance/create a voltage waveform synchronized to inductor current waveform and having a ripple amplitude (e.g., of tens of millivolt). A simple error amplifier (Gm) may be configured to further amplify the ripple (e.g., to around hundreds of millivolts). The error amplifier also provides good DC regulation. The output of the error amplifier may be provided to a pwm comparator (CM1) to generate a trigger pulse to the ON-time generator. The trigger pulse may also be generated by CM0, which compares $V_{FB0}$ (output voltage feedback without ripple enhancement) with $V_{REF}$.

The On-time generator may generate an on-time proportional to the output voltage ($V_O$) and inversely proportional to the input voltage ($V_I$) so that the switching frequency at CCM is a constant in the first order. The on-time pulse, the zcd signal (a signal showing zero-crossing event of switching node (e.g., the node 120 in FIG. 1A)), the output of CM0 "$V_O$_low," and faults signal (e.g., ocp, ovp) may be provided to a logic block. The logic block may generate the high side and low side control signals, which are provided to the driver (to turn on/off top/bottom switches). The logic block may also generate a signal HIQ to control the quiescent current of analog blocks. In the architecture 1200, the only blocks that must be on at all the time during operation is the standby comparator CM0 and bandgap reference (not shown in FIG. 12). All other components may be turned off when HIQ='0.' A simple method to generate the HIQ signal includes using the rising edge of the pwm signal. Individual rising edge of the pwm signal may trigger a HIQ pulse (e.g., of 10 us).

Any of the ripple enhancers shown in FIGS. 2A-2B, 3A-3B, and 4A-4B may be used in the architecture 1200. Any of the ON-time generators shown in FIGS. 8, 9, 10 may be used in the architecture 1200. The use of PLL may be optional for certain applications. The PLL may be implemented as shown in FIG. 11. In some implementations, the architecture 1200 may be adopted with constant off-time control and/or other ripple based control schemes.

Figure 13:
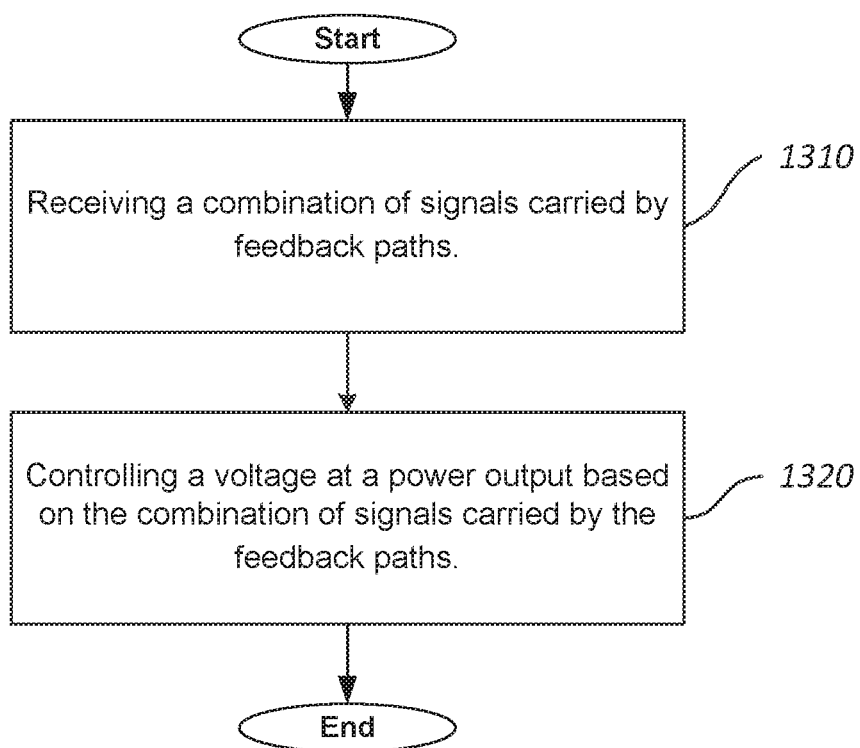
FIG. 13 illustrates a method for providing intelligent constant on-time control in accordance with some implementations of the disclosure.

FIG. 13 illustrates method 1300 for providing intelligent constant on-time control. The operations of method 1300 presented below are intended to be illustrative. In some implementations, method 1300 may be accomplished with one or more additional operations not described, and/or without one or more of the operations discussed. In some implementations, two or more of the operations may occur substantially simultaneously.

The method 1300 may be implemented at a system comprising a first switch coupled to a power input; a second switch coupled to the first switch; a switching node between the first switch and the second switch, the switching node configured to be connected to an inductor and a power output; and feedback paths coupled to (1) the switching node and (2) the power output, the feedback paths enabling feedback of signals from (1) the switching node, and (2) the power output. The method 1300 may be implemented at a system comprising a first switch coupled to a power input; a second switch coupled to the first switch; a switching node between the first switch and the second switch, the switching node configured to be connected to an inductor and a power output; and feedback paths coupled to (1) a synthesized node and (2) the power output, the feedback paths enabling feedback of signals from (1) the synthesized node, and (2) the power output.

At operation 1310, a combination of signals carried by the feedback paths may be received.

At operation 1320, a voltage at the power output may be controlled based on the combination of the signals carried by the feedback paths.

In some implementations, operations and structure of the system may be the same as or similar to one or more of the systems shown in FIGS. 1, 2A-2B, 3A-3B, 4A-4B, 6, 12.

Spatially relative terms such as "under," "below," "lower," "over," "upper," "left," "right," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc. and are also not intended to be limiting. Like terms refer to like elements throughout the description.

As used herein, the terms "having," "containing," "including," "comprising," and the like are open ended terms that indicate the presence of stated elements or features, but do not preclude additional elements or features. The articles "a," "an" and "the" are intended to include the plural as well as the singular, unless the context clearly indicates otherwise.

Although this invention has been disclosed in the context of certain implementations and examples, it will be understood by those skilled in the art that the present invention extends beyond the specifically disclosed implementations to other alternative implementations and/or uses of the invention and obvious modifications and equivalents thereof. Thus, it is intended that the scope of the present invention herein disclosed should not be limited by the particular disclosed implementations described above.

Furthermore, the skilled artisan will recognize the interchangeability of various features from different implementations. In addition to the variations described herein, other known equivalents for each feature can be mixed and matched by one of ordinary skill in this art to construct analogous systems and techniques in accordance with principles of the present invention.

It is to be understood that not necessarily all objects or advantages may be achieved in accordance with any particular implementation of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

What is claimed is:

1. A system that provides intelligent constant on-time control, comprising:
   a first switch coupled to a power input;
   a second switch coupled to the first switch;
   a switching node between the first switch and the second switch, the switching node configured to be connected to an inductor and a power output;
   feedback paths coupled to (1) a synthesized node and (2) the power output, the feedback paths enabling feedback of signals from (1) the synthesized node, and (2) the power output; and
   a controller coupled to the feedback paths, the controller configured to control a voltage at the power output based on a combination of the signals carried by the feedback paths;
   wherein the controller is further configured to control an on-time of the first switch based on the combination of the signals carried by the feedback paths;
   wherein the on-time is controlled by digitally changing a capacitance value, a current mirror ratio or a threshold voltage of the system via a phase-locked loop; and
   wherein the phase-locked loop includes a sequential phase detector, a state machine, and an n-bit bi-direction counter.

2. The system of claim 1, wherein the combination of the signals carried by the feedback paths includes a DC signal from the power output and an AC signal from the synthesized node, the combination excluding a DC signal from the synthesized node.

3. The system of claim 1, wherein the signals from the synthesized node are provided by an inductor current emulator.

4. The system of claim 3, wherein the inductor current emulator comprises:
   a first current source configured to provide a first current; and
   a second current source configured to provide a second current;
   wherein the synthesized node is coupled between the first current source and the second current source.

5. The system of claim 4, wherein:
   the first current is proportional to a voltage at the power input node, and
   the second current is proportional to a voltage at the power output node.

6. The system of claim 5, wherein:
   the first current is proportional to a product of a constant and the voltage at the power input node, and
   the second current is proportional to a product of the constant and the voltage at the power output node.

7. The system of claim 4, further comprising:
   a capacitor coupled in parallel with the second current source.

8. The system of claim 4, further comprising:
   a capacitor coupled between the synthesized node and the controller.

9. The system of claim 8, wherein the controller is further configured to control the first switch and the second switch based on a voltage that includes an AC component of the voltage at the synthesized node, and excludes a DC component of the voltage at the synthesized node.

10. The system of claim 1, further comprising:
    a first resistor coupled between the power output node and the synthesized node; and
    a second resistor coupled to the synthesized node.

11. The system of claim 10, wherein the controller is further configured to control the first switch and the second switch based on a voltage that includes a DC component of a voltage at the power output node, and excludes an AC component of the voltage at the power output node.

12. The system of claim 1, further comprising:
    a capacitor coupled between the synthesized node and the controller;
    a first resistor coupled between the power output node and the synthesized node; and
    a second resistor coupled to the synthesized node.

13. The system of claim 12, wherein the controller is further configured to control the first switch and the second switch based on a voltage that:
- includes an AC component of the voltage at the synthesized node;
- excludes a DC component of the voltage at the synthesized node;
- includes a DC component of a voltage at the power output node; and
- excludes an AC component of the voltage at the power output node.

14. The system of claim 1, wherein:
- the controller is further configured to provide a first control signal and a second control signal;
- the first switch operates according to the first control signal; and
- the second switch operates according to the second control signal.

15. The system of claim 4, further comprising:
- a third switch coupled between the first current source and the synthesized node, wherein the third switch operates according to the first control signal.

* * * * *